United States Patent [19]
Cornelius

[11] Patent Number: 5,833,413
[45] Date of Patent: Nov. 10, 1998

[54] INFLATABLE CARGO LOAD LOCK

[75] Inventor: Wanda Cornelius, San Jose, Calif.

[73] Assignee: Cynthia Cornelius, Felton, Calif.

[21] Appl. No.: 891,579

[22] Filed: Jul. 11, 1997

[51] Int. Cl.[6] ..................................................... B60P 7/14
[52] U.S. Cl. ........................... 410/119; 410/118; 410/129
[58] Field of Search .................................... 410/117, 118, 410/119, 121, 124, 125, 128, 129, 87; 206/522, 593; 296/37.6

[56] References Cited

U.S. PATENT DOCUMENTS

| | | | |
|---|---|---|---|
| Re. 28,788 | 4/1976 | Williamson, III | 410/118 |
| 4,168,667 | 9/1979 | Loomis | 410/118 |
| 4,368,902 | 1/1983 | McDowell | 410/118 X |
| 4,781,498 | 11/1988 | Cox | 410/118 |
| 4,918,904 | 4/1990 | Pharo | 53/472 |
| 5,090,856 | 2/1992 | Moore | 410/118 |
| 5,351,829 | 10/1994 | Batsford | 206/522 |
| 5,458,447 | 10/1995 | Clason | 410/100 |
| 5,678,969 | 10/1997 | Farrell et al. | 410/119 |

Primary Examiner—Stephen T. Gordon
Attorney, Agent, or Firm—Jeffrey A. Hall

[57] ABSTRACT

A packing and loading system, for securing cargo and articles placed in a vehicular compartment, comprising an inflatable bladder element having a top side and a bottom side, and a front end and a rear end. The inflatable bladder element is configured to fit within a vehicular compartment. A valve is positioned on the top side of the inflatable bladder element. The valve permits air under pressure to be supplied to, or released from, the inflatable bladder element, whereby the inflatable bladder element is inflated or deflated. A portable air pressure control system for controlling the air pressure within the inflatable bladder element is operably coupled to an air source and to the inflatable bladder element. A web element comprised of a plurality of straps attached to each other to form a lattice is secured to the inflatable bladder element by a plurality of fasteners. The web element having a plurality of end locks, one end lock is secured to each of a selected group of straps. The plurality of end locks are adapted to be secured to one or more sides of the vehicular compartment.

18 Claims, 2 Drawing Sheets

INFLATABLE CARGO LOAD LOCK

BACKGROUND OF THE INVENTION

1. Field Of Invention

This invention relates to load restraining and protecting devices, and more particularly to a reusable inflatable load restraining and protecting device having a lattice webbing for use in vehicular and other containers.

2. Description Of The Related Art

Various cargo and load protecting devices have been proposed and implemented to protect articles and packages being shipped and transported. Early examples include cartons, small Styrofoam pieces typically referred to as "popcorn" packed inside shipping boxes, soft and hard molded Styrofoam, and plastic filled with air pockets commonly known as "bubble wrap". Such products are difficult to dispose of and do not readily decompose, resulting in environmental problems. Further such products are time consuming to use, difficult to reuse, and not particularly effective, as cargo such as packages can shift, fall, and crush into other packages and damage both the outer packaging and the inner contents.

Significant efforts have been focused on solving such problems. For example, U.S. Pat. No. 5,351,829 issued Batsford teaches the use of a plurality of air inflatable components shaped to fit the corners of articles and U.S. Pat. No. 4,918,904 to Pharo teaches an inflatable pocket having air chambers which are designed to envelope and protect articles contained within the pocket.

Another genre of load and cargo protecting devices is seen in U.S. Pat. No. 3,728,758 (RE 28,788) issued to Williamson, III, where a load retainer utilizes a horizontal rod along which a sheet of material may be moved fore and aft in the container as desired. A similar device is seen in U.S. Pat. No. 4,781,498 issued to Cox showing an adjustable partition for use inside of a transport vehicle.

Another type of cargo or load protecting device is seen in U.S. Pat. No. 5,458,447 issued to Clason where a restraining device for vehicular transport comprises a lattice webbing of straps attached to one another with a plurality of self locking buckles and flat hooks for use in vehicles to restrain cargo loads.

Such cargo and load protecting and restraining devices all suffer from significant limitations when used for protecting cargo loads in vehicles such as trucks, trains, airplanes and the like. When air bladders or other inflatable packaging material are used they tend to shift with the load and are very difficult and awkward to handle, especially when used in large containers such as trucks, train cars, or airplanes. On the other hand, when the more prevalent cargo restraints are used alone, such as lattice webbing, to secure a load, a minimal though still useful amount of protection is achieved as there is no cushioning material to prevent damage to articles, packages, and the like.

Cargo in shipping containers, such as vehicular shipping containers in trucks, railroad cars, airplanes, and the like is vulnerable to damage from a wide variety of sources. For example, the rapid and sudden acceleration and deceleration in transportation with the subsequent rapid or crushing or jarring movements against other packages or the side walls of the shipping container. These types of movement can develop forces sufficient to break fragile items, goods or perishables such as fruits, vegetables, or eggs, and can crack or dent less fragile materials.

When goods such as electronic devices, components, or other manufactured items which have critical tolerances are transported misalignments from movement and shocks create damage to the component or product. Similarly, when fruits, vegetables, eggs or the like, are transported damages may result from shift load bruising that are readily apparent such as the cracking of eggs of damaging of fruit skins, as well as less apparent damages which only show up after the product is delivered, reopened, or consumed.

Products which are shipped in containers are often damaged in transport resulting in both cosmetic and non cosmetic damages to the plastic or other casing materials which are not designed to withstand the forces that occur with load shifting, sudden movements, jolts and the like.

Another type of damage which is significant in cargo transport is load shifting of numerous packages from side to side, end to end, up and down, or from movements in any combination thereof. Load shifting refers to the packages or other cargo loaded toward the top of the shipping container tending to move to fill in spaces that have not been entirely filled during the loading process. This can result in significant loses and damage, especially in the small package transportation industry due to the way in which packages are loaded in the back and to the sides first in order to comply with the need for rapid shipping. The result of such rapid packing methods can mean that the central area is packed less densely than the back, sides and end of the truck or other container. Once packages collapse toward the center, other spaces are created that can allow further movements even in areas that were seemingly packed in a tight and protected manner.

Accordingly, it is the primary object of this invention to provide an inflatable cargo load lock using a combination of an inflatable air bladder secured within a lattice webbing which allows for the efficient, effective, convenient, safe, and clean protection of articles and packages, and which is inexpensive to clean, use, reuse, and manufacture. The cargo load lock of the present invention is very effective in three principal areas of cargo protection, namely, restraint, locking the load, and the cushioning of cargo movements. The inflatable cargo load lock of the present invention is easy to use, quickly deployable in a number of easily anchored positions, quickly and easily stored when not in use, and does not create large amounts of non-recyclable materials. The cargo load lock of the present invention may be used many times before replacement, does not require extensive retooling for its deployment, and provides multiple positioning possibilities so that it can be used regardless of the size of the load. Furthermore, the cargo load lock disclosed herein requires a minimum amount of storage space, is easily inflated or deflated as desired, and may be used to fill in spaces at the rear, top, and sides of cargo loads which if not filed in or properly restrained can easily lead to damage of the cargo by load shifting.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purpose of the invention as embodied and broadly described herein, a packing and loading system is provided, where an inflatable cargo load lock, for securing cargo and articles placed in a vehicular compartment, comprises one or more inflatable bladder elements each having a top side and a bottom side, and a front end and a rear end. The inflatable bladder element is configured to fit within a vehicular compartment. A valve is positioned on the top side of the inflatable bladder element. The valve permits air under pressure to be supplied to, or released from, the inflatable bladder element, whereby the inflatable bladder element is inflated or deflated. A web element comprised of a plurality of straps attached to each other to form a lattice is secured to the inflatable bladder element by a plurality of fasteners. The web element having a plurality of end locks, one end lock is secured to each of a selected group of straps. The plurality of end locks are adapted to be secured to one or more sides of the vehicular compartment. Means for controlling the inflation and deflation of the bladder element is provided by a air pressure control unit configured for continuous pressure monitoring of the air within the inflatable bladder element. The air pressure control unit allows for pressure adjustments responsive to load, temperature, and atmospheric changes.

The inflatable cargo load lock may be provided in a variety of shapes and sizes to accommodate different load sizes and type, and different size and type of vehicular compartments. The inflatable bladder element is preferably composed of vinyl, and the webbing composed of a durable resilient nylon, however, other materials may be used in various embodiments. The inflatable bladder element is easily inflated or deflated allowing for quick and easy positioning within a vehicular compartment, such as a truck trailer, or the cargo hold of a boat, train, airplane, or the like.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DESCRIPTION OF THE PREFERRED EMBODIMENTS

Reference will now be made in detail to the present preferred embodiments of the invention as illustrated in the accompanying drawings.

In accordance with the present invention, there is provided in a preferred embodiment of the invention, a packing and loading system, for securing cargo and articles placed in a vehicular compartment, comprising one or a plurality of inflatable bladder elements or inflatable membranes, each having a top side and a bottom side, and a front end and a rear end. The inflatable bladder element is configured to fit within a vehicular compartment. A valve is positioned on the top side of the inflatable bladder element. The valve permits air under pressure to be supplied to, or released from, the inflatable bladder element, whereby the inflatable bladder element is inflated or deflated. A web element comprised of a plurality of straps attached to each other to form a lattice is secured to the inflatable bladder element by a plurality of fasteners. The web element having a plurality of end locks, one end lock is secured to each of a selected group of straps. The plurality of end locks are adapted to be secured to one or more sides of the vehicular compartment. Means for the controlled inflation or deflation of the inflatable bladder element by air or other gasses is provided by an pressure control unit operably coupled to each inflatable bladder element.

Figure 1:
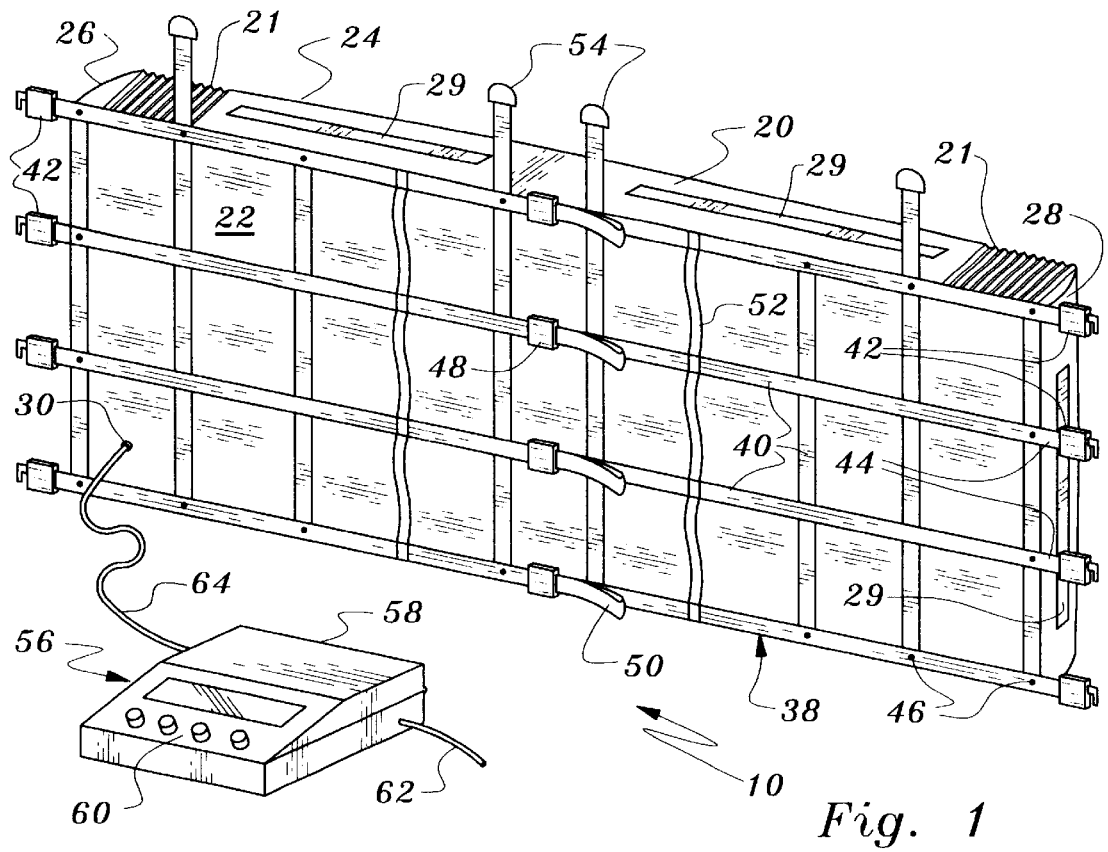
FIG. 1 is a front perspective view of an inflatable cargo load lock, according to the invention.
Figure 3:
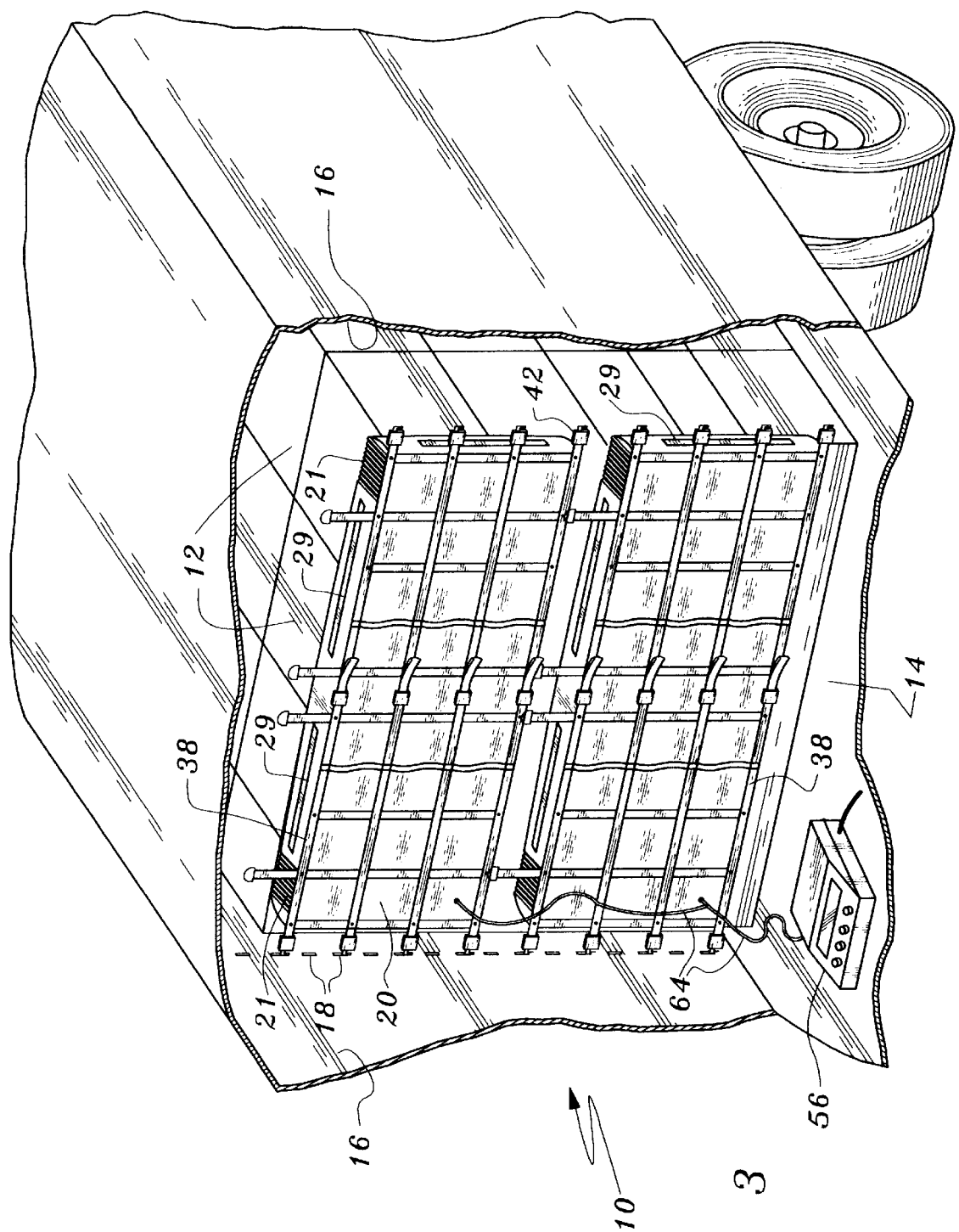
FIG. 3, shows an inflatable cargo load lock positioned within a vehicular compartment, according to the invention.

In FIG. 1, the inflatable cargo load lock 10 is shown according to a preferred embodiment of the invention. Cargo load lock 10, is preferably used for securing and protecting cargo and articles 12, placed in a vehicular compartment 14, as seen in FIG. 3. The inflatable cargo load lock 10 includes an inflatable bladder element 20 having a top side 22, a bottom side 24, a front end 26 and a rear end 28. Inflatable bladder element 20 is preferably rectangularly configured, however, in alternative embodiments may have a square, oval, oblong or other configuration as desired. Inflatable bladder element 20 may be accordion-like pleated or creased 21 to allow a more predictable surface on inflation. An expansion limiter 29, which may be a strip of rubber, plastic or the like, may be secured to a side, or sides, or end to control the shape of the inflatable bladder 20. One, two, or multiple inflatable bladder elements 20 may be combined and secured together as desired. Inflatable bladder element 20 is preferably composed of vinyl, however, other durable resilient material may be used such as rubber, plastics, and the like.

Figure 2:
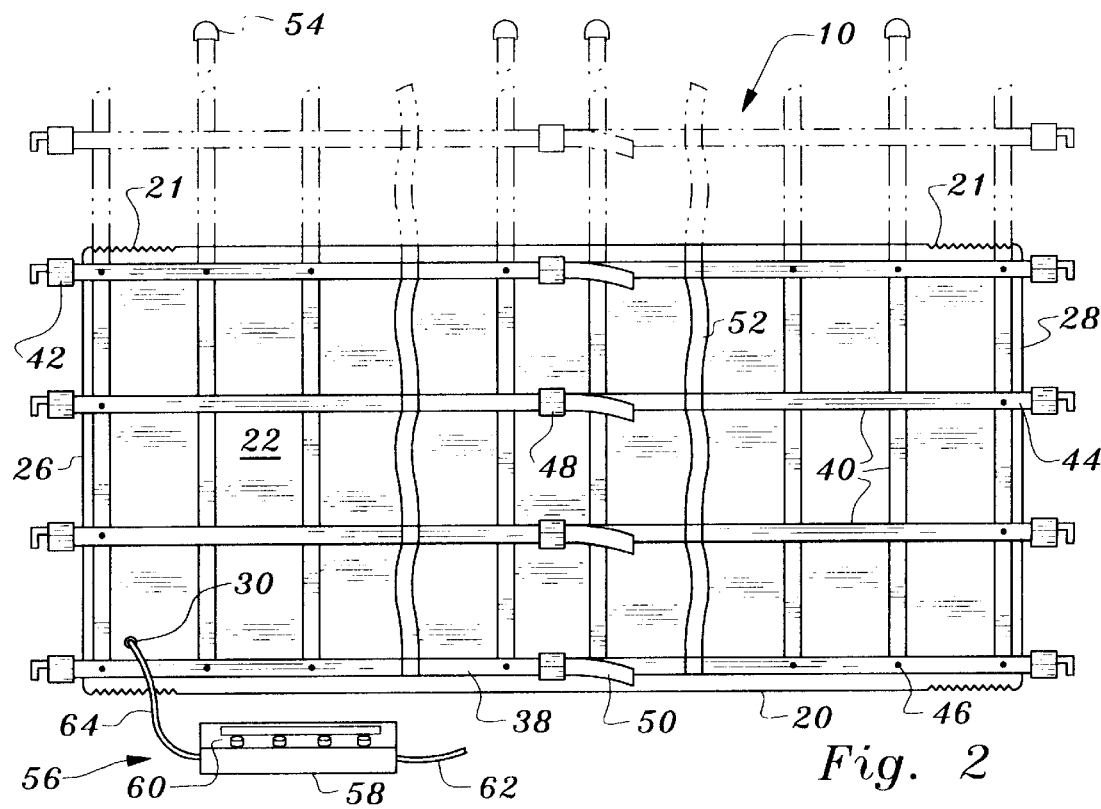
FIG. 2 is a top view of an inflatable cargo load lock, according to the invention.

In reference now to FIG. 2, valve means, preferably comprising valve 30, are secured and positioned on top side 22 of inflatable bladder element 20. Valve 30 permits air under pressure to be supplied to, or released from, the inflatable bladder element 20, so that inflatable bladder element 20 may be inflated or deflated as desired. This allows for the easy positioning or removal of inflatable cargo load lock 10 from a vehicular compartment such as a truck trailer, train or airplane cargo container, or the like.

Inflatable bladder element 20 is preferably coupled to means for controlling the inflation and deflation of the inflatable bladder element, preferably an air pressure control unit 56. Air pressure control unit 56 preferably is portable and includes a steel housing 58 containing pneumatic controls 60. Intake hose 62 connects to an air or other gas source and hose 64 is preferably secured to valve 30 with quick disconnect fittings. Housing 58 is preferably about two feet square and ten inches deep with a hinged lid allowing for access to the pneumatic controls inside. Preferably hoses 62 and 64 are flexible rubber pneumatic hoses of about ½ inch in diameter with quick disconnect fittings at both ends.

In FIGS. 1, 2, and 3, a web element 38 is shown operably secured to inflatable bladder 20. Web element 38 is comprised of a plurality of straps 40 attached or woven to each other to form a lattice or web. A set of straps 44 of web element 38 has an end lock, preferably a spring loaded end lock 42 mounted thereon. The plurality of end locks 42 are each adapted to be received and secured to one or more wall 16 or sides of vehicular container 14 preferably in receiving slots or holds 18. Web element 38 is secured to inflatable bladder by a plurality of fasteners, preferably rivets 46.

As seen if FIG. 1, web element 38 may also include a hand hold 50, secured to one or more of the plurality of straps 40, for carrying, moving, or positioning inflatable cargo load lock 10. Web element 38 may be composed of nylon, plastic, rubber, or other durable resilient material. Cam buckles 48, secured to web element 38, allow for inflatable cargo load lock 38 to be positioned and secured to an article or articles 12 as desired. Also useful for positioning and securing web element 38 is slip strap 52, seen in FIG. 1, and D-rings 54.

In operation and use inflatable cargo load lock 10 is very convenient, easy, reliable, and effective to use for positioning, protecting, securing and locking articles such as packages, merchandise, containers, and the like in vehicular compartment 14. Inflatable load lock 10 may be used in trucks, trains, planes, and other vehicles for protecting cargo and other articles. Inflatable load lock 10 is positioned and secured within vehicular compartment 14 by securing spring loaded end locks 42 in receiving slots or holds 18 in walls 16 of vehicular compartment 14. Web element may be tightened and secured around cargo 12 using cam buckles 48 and D-ring 54. Valve 30 is used to inflate or deflate inflatable bladder 20 as desired, so as to fill in spaces, restrain, and lock the load. Air pressure control unit 56 is used to inflate inflatable bladder element 20, and to continuously monitor air pressure within the inflatable bladder. Preferably, the air pressure control unit 56 is placed on the back end of the truck, trailer, or compartment and hose 62 connected to the air source and hose 64 to the inflatable bladder element. Air pressure control unit 56 may also serve as a safety regulator which prevents over-inflation or deflation of the inflatable bladder element 20 by continuous monitoring which may be programmed to be responsive to temperature and atmospheric changes so as to keep a constant pressure in the bladder and on the load being locked. Air pressure control unit 56 also may include a partial vacuum shunt so the membranes can be quickly evacuated during unloading.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. An inflatable cargo load lock, for securing cargo placed in a vehicular compartment, said inflatable cargo load lock, comprising:

an inflatable bladder element, said inflatable bladder element having a top side and a bottom side, and a front end and a rear end; said inflatable bladder element being configured to fit within a vehicular compartment;

a valve; said valve being positioned on said top side of said inflatable bladder element; said valve permitting air under pressure to be supplied to, or released from, the inflatable bladder element, whereby the inflatable bladder element is inflated or deflated;

a web element, said web element comprised of a plurality of straps attached to each other to form a lattice; said web element having a plurality of end locks secured to a selected group of said straps; said plurality of end locks being adapted to be received and secured to one or more sides of said vehicular compartment; the web element being operably coupled to the inflatable bladder element by a plurality of fasteners; and means for inflating, deflating and controlling the air pressure within the inflatable bladder element.

2. The inflatable cargo load lock of claim 1, wherein said inflatable bladder element is rectangularly configured.

3. The inflatable cargo load lock of claim 1, wherein said inflatable bladder element is round.

4. The inflatable cargo load lock of claim 1, wherein said inflatable bladder element is oval shaped.

5. The inflatable cargo load lock of claim 1, wherein said inflatable bladder element is composed of vinyl.

6. The inflatable cargo load lock of claim 1, wherein said valve is a quick release type valve.

7. The inflatable cargo load lock of claim 1, wherein each of said plurality of end locks is a spring loaded lock, being configured to be operably coupled with fittings in said vehicular compartment.

8. The inflatable cargo load lock of claim 1, wherein said web element includes a plurality of cam buckles for securing the web element in a position for protecting an article.

9. The inflatable cargo load lock of claim 1, wherein said fasteners securing said web element to said inflatable bladder are rivets.

10. The inflatable cargo load lock of claim 1, wherein said web element is composed of nylon.

11. The inflatable cargo load lock of claim 1, wherein said means for controlling the air pressure within the inflatable bladder element comprises an air pressure control unit having and intake hose operably coupled to an air source, a supply hose operably coupled to the inflatable bladder element, and pneumatic control means for controlling the air pressure within the inflatable bladder element.

12. A loading and locking system for securing and protecting an article placed in a vehicular compartment, comprising:

a portable inflatable bladder having a top side and a bottom side, and a front end and a rear end; said portable inflatable bladder being sized to fit within a vehicular compartment;

valve means for permitting air under pressure to be supplied to or released from said inflatable bladder; said valve means being operably positioned to said top side of the inflatable bladder; and a lattice webbing, said lattice webbing including a plurality of straps secured to one another to form a lattice; said lattice webbing being secured to said inflatable bladder by a plurality of fastening elements.

13. The loading and locking system of claim 12, wherein said valve means comprises a quick release type valve.

14. The loading and locking system of claim 12, wherein said fastening elements securing said lattice webbing to said portable inflatable bladder comprise rivets.

15. The loading and locking system of claim 12, wherein said lattice webbing is securable to said vehicular compartment by a plurality of end locks secured to a selected group of said straps of the lattice webbing.

16. The loading and locking system of claim 12, wherein said portable inflatable bladder is operably secured to an air pressure control system for inflating and deflating the portable inflatable bladder.

17. The loading and locking system of claim 12, wherein said portable inflatable bladder has a pleated segment on one or more sides thereof.

18. The loading and locking system of claim 12, wherein said portable inflatable bladder has an expansion limiter on one or more sides thereof.

* * * * *